Nov. 13, 1934.   J. H. MORISSEAU   1,980,493
EMPTYING DEVICE FOR BATHING TUBS OR THE LIKE
Filed Sept. 30, 1932   2 Sheets-Sheet 1
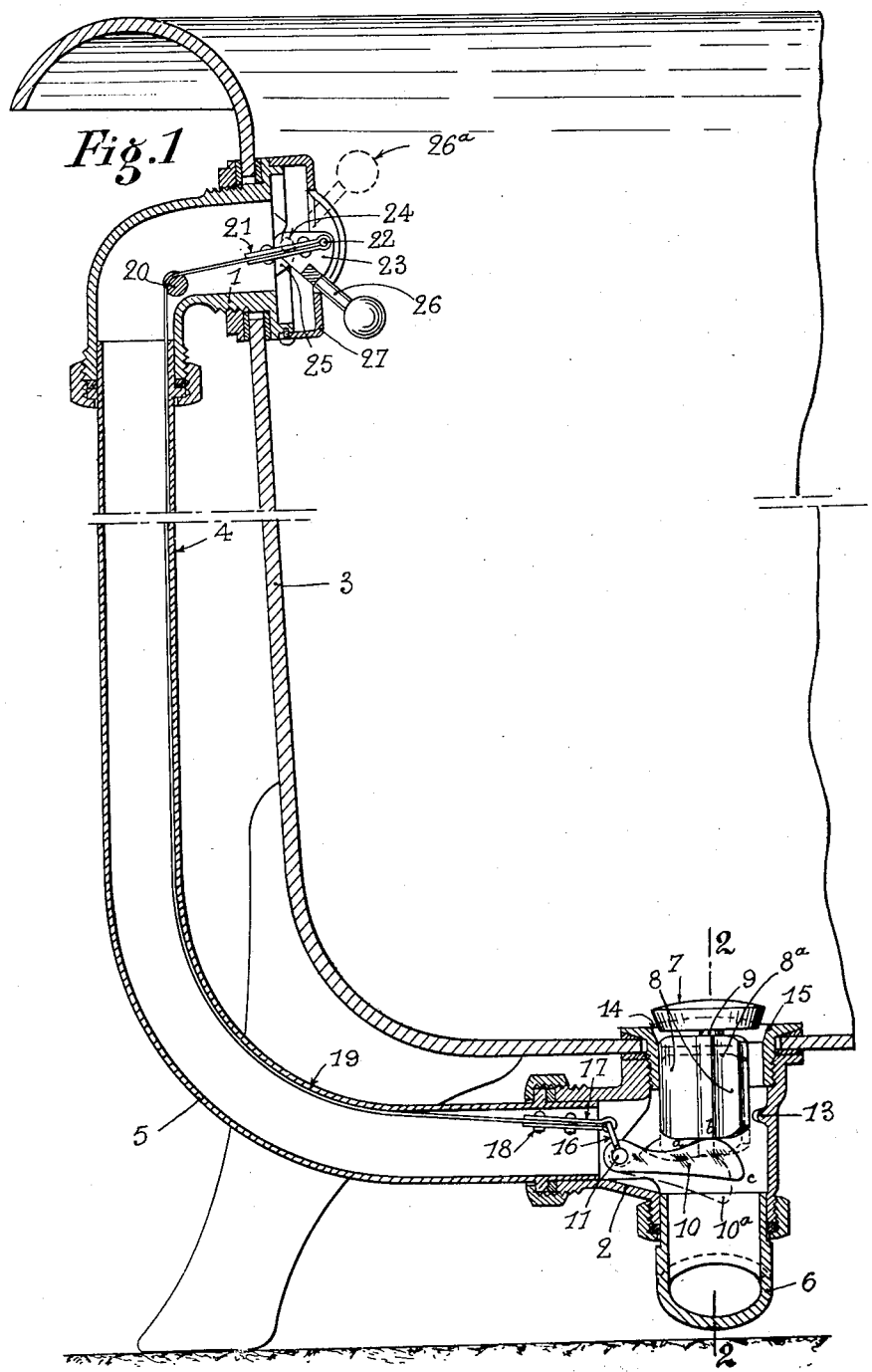
Jacques Henri Morisseau
INVENTOR:
Attorney.

Nov. 13, 1934.  J. H. MORISSEAU  1,980,493
EMPTYING DEVICE FOR BATHING TUBS OR THE LIKE
Filed Sept. 30, 1932  2 Sheets-Sheet 2
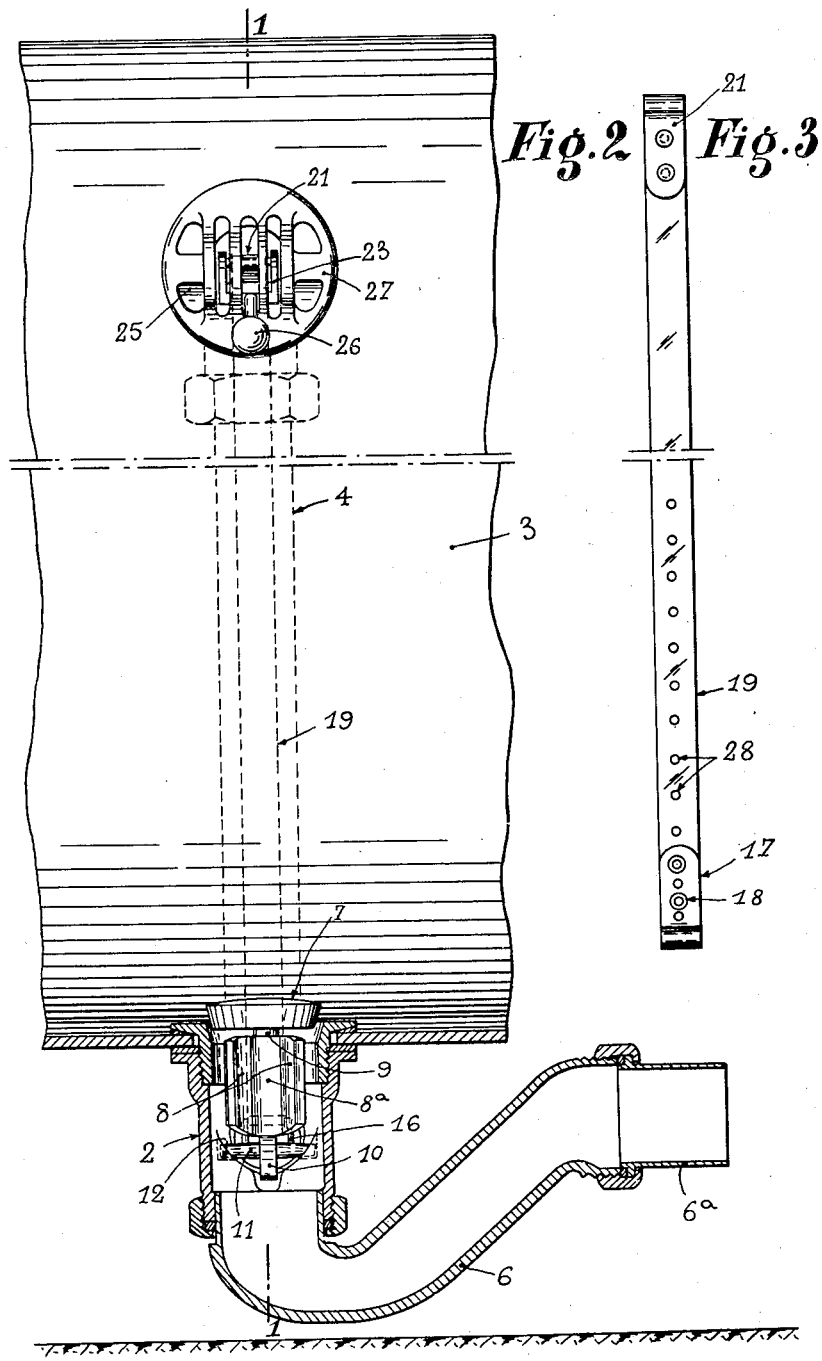
Jacques Henri Morisseau
INVENTOR;

Patented Nov. 13, 1934

1,980,493

UNITED STATES PATENT OFFICE 1,980,493

EMPTYING DEVICE FOR BATHING-TUBS OR THE LIKE

Jacques Henri Morisseau, Paris, France

Application September 30, 1932, Serial No. 635,484
In France May 4, 1932

8 Claims. (Cl. 4—199)

In the known distant-control devices for the emptying of bathing-tubs, the transmission of the movement from the operating device which is generally located on the strainer cap of the overflow, to the valve of the bung of the bathing-tub, is usually effected in the following manner: A handle controlling an eccentric member serves to raise an operating link connected with a lever located in the horizontal part of the overflow tube. This lever raises the metallic valve which is suitably guided, thus emptying the bathing-tub, whilst the contrary movement lowers and closes the valve. The discharge usually takes place in the angle formed by the two tubes, the siphon tube being generally placed at this point.

This form of apparatus is subject to numerous drawbacks. It is difficult to adjust the length of the operating link, and for this purpose the apparatus must often be dismounted and assembled several times. The amplitude of movement of this link may be increased according to the ratio between the lever arms, which is considerable. Besides the difficulty in the adjustment, the opening action of the valve is not reliable, due to the elasticity of the lever arm. After a certain time of use, the valve will no longer descend upon its seat, unless it is pushed in place. Since the used water is discharged through the horizontal tube, such water will prematurely clog up the mechanism, and the apparatus will be inoperative. On the other hand, should the mechanism be clogged, broken, or out of order, the apparatus must be entirely dismounted. When the bathing-tub is of the type which is fitted or built in place, the apparatus can only be dismounted by the use of an inspection door, which is of an expensive construction, and even in this case it is a very difficult matter to make repairs.

The present invention relates to an emptying device for bathing-tubs and the like, by which all such drawbacks are obviated.

The said device is chiefly characterized by the fact that the controlling means are connected with the lever or like member adapted to act upon the valve, by means of a flexible metallic band, or analogous connecting member, passing around the outside of the bathing-tub or the like.

According to another feature of the invention, said connecting member is located in a tube by which it is guided, and it can thus be at once put in place without removing any of the parts, by inserting it through the bung and simply running it through the said tube.

The guide tube preferably serves as the overflow tube, and it connects the upper orifice of the overflow device and upon which the arrangement for the valve control is mounted, and the valve itself, the siphon tube for the discharge being directly connected with the lower end of the said valve.

In the accompanying drawings, which are given solely by way of example:

Fig. 1 is a vertical cross-section of a bathing-tub on the line 1—1 of Fig. 2, showing said apparatus;

Fig. 2 is an elevational view, partly in section on the line 2—2 of Fig. 1;

Fig. 3 is a front view of the metallic connecting band.

In the form of construction herein represented, element 1 forming the overflow orifice is connected with a T shaped member 2 forming the main body of the bung of the bathing-tub 3, by a copper or like tube 4, which is bent at right-angles, the elbow 5 having a relatively large radius of curvature.

The used water is evacuated directly through a siphon conduit 6, situated below the said bung 2. The said conduit, whose form comprises curves of large radius, has a uniform flow section offering no obstacle to the discharge of the water. This conduit may thus be cleaned by a flexible rod or the like which may be inserted through the bung. The said siphon conduit can rotate about the vertical axis 2—2 of the bung.

The bung is closed by means of a valve 7, of copper or the like, which is guided by triangular projections or flanges 8. The height of the valve disc 7 is regulated by a threaded rod 9 which can be more or less screwed into the central part 8a which is common to the flanges 8.

The valve disc 7 rests upon a lever 10, formed in one with or keyed to an axle pin 11 mounted in two lateral bearings or recesses 12 in the body 2, and the direction of said recesses is such that the resultant of the stresses exerted upon said axle pin will be perpendicular to the bottom of the recesses. Thus when the axle pin is subjected to such stresses, it will be applied against its bearing surfaces.

The lever 10 has preferably the outline abc (Fig. 1) which is such that even when said lever is completely raised, it will remain in contact with the central part 8a common to all flanges 8. Hence if after the valve 7 has been removed, the lever 10 entirely raised and the valve again put in place, said valve will not be separated from said lever, and will be always in contact therewith.

It should be noted that the valve 7 may be rotated in a suitable direction, by any means, in order that the lever 10 may coincide with any one of the flanges 8, and for instance the body 2 may be provided with a horizontal rib 13 of such length that the valve 7 can only pass by this rib when two adjacent flanges 8 are situated on either side of the said rib.

The seating 14 of the valve 7 is preferably notched at 15 in order that the valve may be raised by hand, should it have been accidentally placed in the bung before the lever 10 has been inserted in place.

The axle pin 11 carries a wire loop 16 passing through a connecting forked member 17 which is secured by small bolts 18 to the end of a flexible metallic band 19 (Figs. 1 to 3).

At the upper end of the tube 4, the band 19 passes over a bar 20 placed across the overflow elbow, said bar being preferably flattened in order to prevent all undue hardening of the band by friction.

The end of the band 19 is mounted by means of a connecting member 21 on a spindle 22 (Fig. 1) which is screwed into a member 23 provided with two journals 24 operating in two respective bearings 25 provided in the body 1 of the overflow device. The member 23 carries a handle 26 extending through the apertured cap or strainer 27 of the overflow device.

The apparatus is assembled in the following manner. The flexible band 19, which has a certain rigidity, is first connected with the lever 10. The other end, provided with its connecting member 21, is then inserted into the overflow tube 4 through the open end of the bung 2. By pushing in the said band, its upper connecting member 21 engages in the body 1 of the overflow device, and then emerges out of the latter, upon which the workman seizes it and secures the emerging end to the controlling member 23, by inserting the axle pin 22 through the said connecting member 21. The strainer 27 of the overflow is then put in place.

When the handle 26 is turned down, this draws upon the flexible band, thus raising the lever 10 into the position shown in the full lines, and hence lifting the valve 7. When the handle 26 is raised into the position 26a, the weight of the valve will lower the lever 10 into the position 10a, and the valve 7 thus descends upon its seat.

The device according to the invention affords numerous advantages.

The used water is discharged directly into the outlet conduit 6 without meeting with any obstacles tending to retain the impurities. The stream of liquid is continuous, without any abrupt bends or variation of section, thus providing for a rapid discharge.

The valve 7 may be removed from its recess in order to permit of cleaning the conduit 6 and the discharge pipe 6a, by means of a hose placed in the interior of the bathing-tub.

The greater part of the mechanism is contained in the overflow tube 4, and this only contains the overflow water which is usually rather clean, so that the mechanism is free of any trouble which might be caused by the circulation of impurities. The mechanism allows the free passage of the water in the overflow device, which will thus operate at its full capacity.

The mechanism can be very simply mounted and adjusted. The length of the flexible band 19 is adjusted by the attaching of the end connecting members to the band, said connecting members, as well as the band, being for instance pierced with holes 28 spaced every 5 mm. for the connecting member and every 10 mm. for the band, and thus the adjustment can be made within 5 mm.

In the event of wear of the mechanism, all parts subject to wear may be replaced by operating from the inside of the bathing-tub, and in the case of bathing-tubs which are fitted in place, no inspection door is required. All upkeep of the mechanism, as well as the clearing out of the bung, can be effected through the overflow and the bung. The effect of an abnormal vertical stress upon the valve of the bathing-tub will offer no inconvenience. This will only bring an additional traction stress upon the steel band, which has a great strength.

Obviously, the said invention is not limited to the form of construction herein described and represented, which is given solely by way of example. It is evident that the said apparatus can be used for sinks, wash-stands and the like without departing from the principle of the present invention.

Having now described my invention, what I claim as new and desire to secure by Letters Patent is:

1. An emptying device for bathing-tubs and the like, comprising an overflow tube, a valve located at the lower portion of said overflow tube and adapted to open and close the emptying orifice of said bathing-tub or the like, a lever supporting said valve, an oscillating handle located at the upper end of said overflow tube, a spindle on said handle and flexible means pivoted at one end to said spindle and at the other end to said lever, two journals supporting said lever, recesses in the wall of said emptying orifice for receiving said journals, said recesses being preferably so arranged that the forces exerted upon said lever by said flexible means and by said valve apply said journals against the bottom of said recesses.

2. An emptying device for bathing tubs and the like comprising in combination a valve member for opening and closing the outflow of said bathing tub and freely located directly above the outflow conduit, controlling means for said valve member, flexible means for positively actuating said controlling means and tubular means containing said flexible means and disposed outside said bathing tub, said tubular means moreover connecting the outflow conduit with the upper portion of said bathing tub, whereby said valve member and said controlling and flexible means are so located in said tubular means and said outflow conduit, that the outflow stream always remains substantially continuous and without exaggerated variation of its cross-section.

3. An emptying device for bathing tubs and the like comprising in combination a valve member for opening and closing the outflow of said bathing tub and freely located directly above the outflow conduit, controlling means for said valve member, pivotally mounted outside said outflow conduit and extending under the valve member, whereby during one operation of the emptying device the contact point between said valve member and said controlling means is adapted to be displaced substantially along the axis of said valve member, flexible means for positively actuating said controlling means and tubular means containing said flexible means and disposed outside said bathing tub, said tubular means moreover connecting the outflow conduit with the upper portion of said bathing tub, whereby said valve member and said controlling and flexible means are so located in said tubular means and said outflow conduit, that the outflow stream always remains substantially continuous and without exaggerated variation of its cross-section.

4. An emptying device for bathing tubs and the like comprising in combination a valve member for opening and closing the outflow of said bathing tub and freely located directly above the outflow conduit, radial flanges on said valve member, controlling means for said valve member extending under this latter and substantially disposed in the vertical plane of at least one of said flanges, flexible means for positively actuating said controlling means and tubular means containing said flexible means and disposed outside said bathing tub, said tubular means moreover connecting the outflow conduit with the upper portion of said bathing tub, whereby said valve member and said controlling and flexible means are so located in said tubular means and said outflow conduit, that the outflow stream always remains substantially continuous and without exaggerated variation of its cross-section.

5. An emptying device for bathing tubs and the like comprising in combination a valve member for opening and closing the outflow of said bathing tub and freely located directly above the outflow conduit, radial flanges on said valve member, controlling means for said valve member pivotally mounted outside said outflow conduit, extending under at least one of said flanges and substantially disposed in the vertical plane thereof, whereby during one operation of the emptying device the contact point between said valve member and said controlling means is adapted to be displaced substantially along the axis of said valve member, flexible means for positively actuating said controlling means and tubular means containing said flexible means and disposed outside said bathing tub, said tubular means moreover connecting the outflow conduit with the upper portion of said bathing tub, whereby said valve member and said controlling and flexible means are so located in said tubular means and said outflow conduit, that the outflow stream always remains substantially continuous and without exaggerated variation of its cross-section.

6. An emptying device for bathing tubs and the like comprising in combination a valve member for opening and closing the outflow of said bathing tub and freely located directly above the outflow conduit, controlling means for said valve member, flexible means for positively actuating said controlling means and an overflow tube having at least a curved portion of a preferably considerable radius and containing said flexible means, whereby said flexible means which is adapted to always work under traction for opening and closing said valve member is applied against the inner wall of said overflow tube, whereas said valve member and said controlling and flexible means are so located in said overflow tube and outflow conduit that the outflow stream always remains substantially continuous and without exaggerated variation of its cross-section.

7. An emptying device for bathing tubs and the like comprising in combination a valve member for opening and closing the outflow of said bathing tub and freely located directly above the outflow conduit, controlling means for said valve member, flexible means for positively actuating said controlling means and tubular means containing said flexible means and disposed outside said bathing tub, said tubular means moreover connecting the outflow conduit with the upper portion of said bathing tub, whereby said valve member and said controlling and flexible means are so located in said tubular means and said outflow conduit, that the outflow stream always remains substantially continuous and without exaggerated variation of its cross-section, and further comprising shifting means for said flexible means, a forked member connected with said shifting means, a number of holes in said forked member and in said flexible means and attaching members adapted to be inserted in said holes for adjustably connecting said flexible means with said forked member.

8. An emptying device for bathing tubs and the like comprising in combination a valve member for opening and closing the outflow of said bathing tub and freely located directly above the outflow conduit, controlling means for said valve member, flexible means for positively actuating said controlling means and tubular means containing said flexible means and disposed outside said bathing tub, said tubular means moreover connecting the outflow conduit with the upper portion of said bathing tub, whereby said valve member and said controlling and flexible means are so located in said tubular means and said outflow conduit, that the outflow stream always remains substantially continuous and without exaggerated variation of its cross-section, and further comprising a detachable inlet strainer covering said overflow orifice, the end of said flexible means projecting into said strainer beyond the wall of said bathing-tub.

JACQUES HENRI MORISSEAU.